Feb. 8, 1949.    G. H. LOVINS    2,460,836
LEVEL DEVICE EMPLOYING A LIGHT REFLECTING LIQUID
SURFACE AS A HORIZONTAL REFERENCE SURFACE
Filed June 4, 1946    2 Sheets-Sheet 1

Inventor
GERALD H. LOVINS
By Herman L. Gordon
Attorney

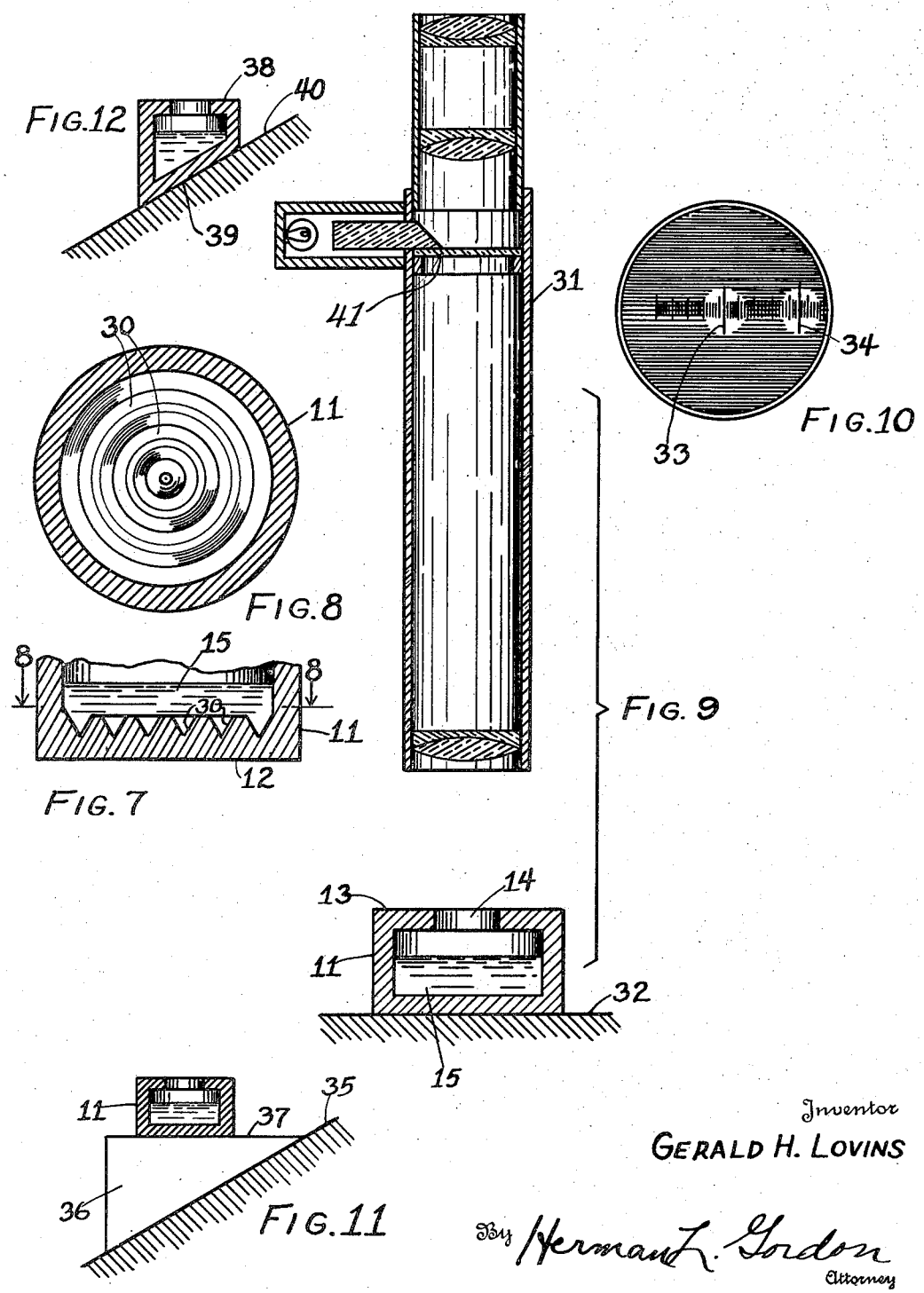

Patented Feb. 8, 1949

2,460,836

UNITED STATES PATENT OFFICE 2,460,836

LEVEL DEVICE EMPLOYING A LIGHT REFLECTING LIQUID SURFACE AS A HORIZONTAL REFERENCE SURFACE

Gerald H. Lovins, Silver Spring, Md., assignor, by mesne assignments, to American Instrument Co., Inc., a corporation of Maryland Application June 4, 1946, Serial No. 674,271

1 Claim. (Cl. 88—1)

This invention relates to levels, and more particularly to an improved method and means for determining with great accuracy the angular deviation from horizontal of a surface.

A main object of the invention is to provide a novel and improved level device of very simple construction which is very easy to use and which provides very accurate measurement of the angular deviation of a surface from horizontal.

A further object of the invention is to provide an improved level device of very high sensitivity, said device employing the surface of a liquid pool as the reference horizontal surface.

A still further object of the invention is to provide an improved level device of very simple and inexpensive construction adapted to be employed with a standard auto-collimator or the like for measuring with very high precision small angles of deviation from horizontal of various surfaces, said device being particularly useful in precisely adjusting to a level condition instruments such as those employed in physical laboratories, observatories, and the like, and having further application when employed with suitable standard wedge blocks, as a highly sensitive and accurate gauge device for determining the slope with respect to horizontal of any inclined surface.

Further objects and advantages of the invention will become apparent from the following description and claims, and from the accompanying drawings, wherein:

Figure 7 is a vertical cross-sectional view showing a modification of the damping means employed for the reference liquid pool according to the present invention.

Figure 8 is a horizontal cross-sectional view taken on line 8—8 of Figure 7.

Figure 9 is a vertical cross-sectional view showing a level device according to the present invention employed with a standard auto-collimator for measuring very small angles of a surface from horizontal.

Figure 10 illustrates the view as seen through the eyepiece of the auto-collimator of Figure 9.

Figure 11 is a sectional view illustrating the use of a level device of the present invention with a calibrated wedge block to measure a substantial angle of inclination to the horizontal.

Figure 12 is a sectional view of a level device according to the present invention modified to measure a substantial angle to the horizontal.

Figure 2:
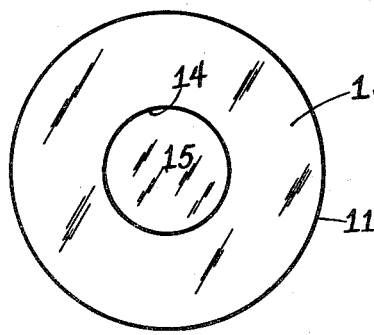
Figure 2 is a top plan view of a level device constructed in accordance with the present invention.
Figure 3:
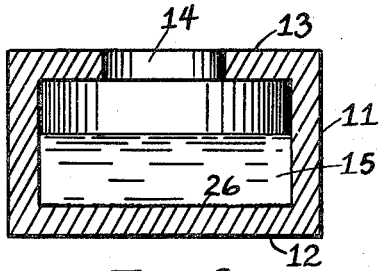
Figure 3 is a vertical cross-sectional view of the level device shown in Figure 2.

Referring to the drawings, and more particularly to Figures 2 and 3, the level device shown in these figures comprises a cup-shaped container 11 having a plane bottom surface 12 and a plane top surface 13 which is parallel to bottom surface 12 to a degree of accuracy within the angular sensitivity of the optical viewing or measuring device, to be subsequently described, which is employed with the level device. Formed in the top wall of the container 11 is an aperture 14. Carried in the container is a quantity of fluent material 15, which may be mercury or any other opaque liquid having substantial surface reflectivity, or any transparent liquid having an index of refraction appreciably greater than that of air. Top surface 13 is highly polished or suitably plated with reflective material to provide an optically plane mirror surface.

Figure 1:
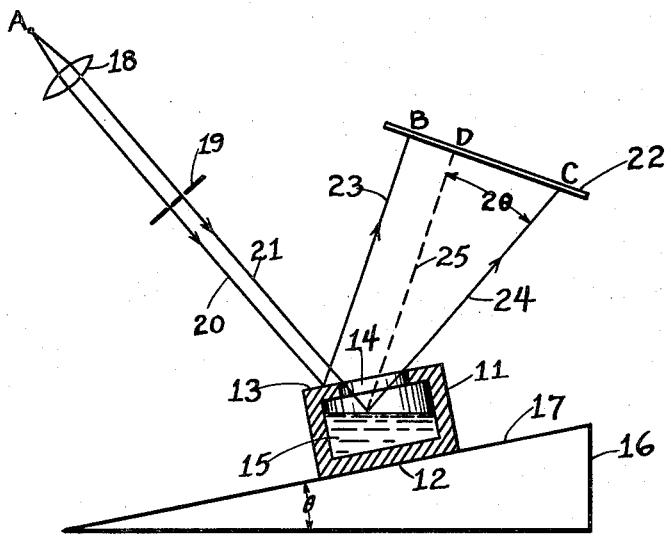
Figure 1 is a diagrammatic view illustrating a main principle of the present invention.

Referring to Figure 1, 16 designates an object having a top surface 17 inclined at an angle θ to the horizontal. Container 11 is placed on surface 17, whereupon the top surface of fluent material 15 becomes accurately horizontal. Assume that A is an illuminated object located in the focal plane of a lens 18. Emerging from lens 18 are an infinite number of parallel light beams. Placed in the path of said beams is a screen device 19 having a pair of apertures, said apertures being arranged to direct a first beam 20 onto the reflective top surface 13 of container 11 and a second beam 21 through aperture 14 onto the reflective top surface of fluent material 15. Placed in the path of the reflected beams is a screen 22.

By reflection from surface 13, incident beam 20 produces a reflected beam 23 which strikes screen 22 at a point B. By reflection from the top surface of fluent material 15, incident beam 21 produces a second reflected beam 24 which strikes screen 22 at a second point C. If an imaginary line 25 be drawn from the point of incidence of beam 21 on the top surface of fluent material 15 parallel to reflected beam 23 to a point D on screen 22, it can be readily shown from the laws of reflection from plane surfaces that the angle between line 25 and beam 24 is double the angle θ. Distance BC is therefore a definite function of angle θ, and if screen 22 is suitably calibrated, angle θ may be read therefrom over a wide range of variation of said angle. If surface 17 is horizontal beam 24 will coincide with line 25 and image C will fall on point D, point D representing zero angle of inclination of surface 17 with respect to horizontal.

As shown in the drawings, the container is preferably cylindrical, although other shapes may be successfully employed. Aperture 14 is preferably circular and is preferably centered with respect to top surface 13. The inner bottom surface of the container is preferably roughened, as shown at 26, to prevent specular reflection where a transparent fluid is employed as the fluent material.

Figure 4:
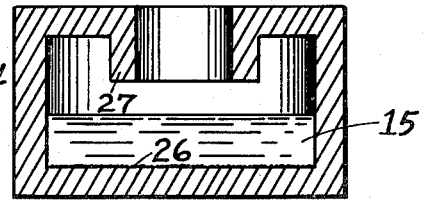
Figure 4 is a vertical cross-sectional view of a further embodiment of a level device according to the present invention.

As shown in Figure 4, the aperture in the top wall of the container may be formed with a depending annular rim 27 to prevent spilling of the fluent material 15 when the container is tilted or shaken during transportation thereof or by other accidental causes.

Figure 5:
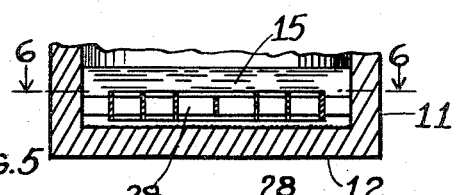
Figure 5 is a vertical cross-sectional detail view showing damping means for the reference liquid pool as employed in a still further embodiment of the level device of this invention.
Figure 6:
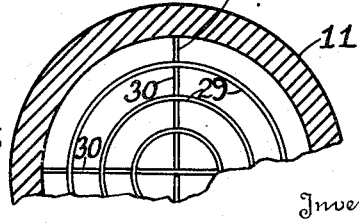
Figure 6 is a horizontal cross-sectional view taken on line 6—6 of Figure 5.

To provide effective damping of the fluent material 15 for low frequency vibrations, a baffle device 28 may be provided in the container comprising a plurality of concentric bands 29 secured to and supported on a pair of crossed strips 30 whose ends are secured to the inner wall surfaces of the container. This structure is shown in Figures 5 and 6. Baffle device 28 is spaced above the bottom surface of the container cavity to allow the fluent material to shift with substantial freedom during normal use of the level device.

An alternative low-frequency vibration damping structure is shown in Figures 7 and 8 wherein integral concentric ribs 30 are formed in the bottom of the container cavity to provide the damping action.

Referring to Figure 9, a level device according to the present invention is disclosed as employed in conjunction with a conventional auto-collimator device 31 to determine very accurately the angular deviation from horizontal of a nearly horizontal surface 32. The auto-collimator device 31 may be similar to the type disclosed in detail in United States Patent No. 1,736,682 to L. B. Tuckerman, issued November 19, 1929. The auto-collimator is positioned over the level device in the manner indicated in Figure 9. When viewed through the eyepiece of the auto-collimator, a first image 33 of the fiducial mark shown at 41 in Figure 9, appears on the scale, said image being obtained by reflection from mirror surface 13. A second image 34 of said fiducial mark is also seen, said second image being displaced from first image 33 on the scale in accordance with the angular inclination of surface 32 from horizontal, said second image being obtained by reflection from the horizontal top surface of the fluent material 15.

Figure 10 illustrates the appearance of the auto-collimator field when viewed through the eyepiece thereof. The distance between the images 33 and 34 on the scale of the auto-collimator is a measure of the angular deviation of surface 32 from horizontal. The scale may be calibrated to read directly in angular units, such as seconds of arc, radians, or the like.

It is apparent that with the arrangement of Figure 9 level readings of very high accuracy may be obtained, and that the sensitivity of the instrument to very small angles of inclination from horizontal of the surface being tested is exceptionally high. The auto-collimator 31 may be held at any distance, limited only by the working aperture of the objective lens of the auto-collimator, above the container 11 without affecting the accuracy of the measurements, but should be oriented so that the images of the fiducial mark are aligned with the scale of the instrument, as illustrated in Figure 10.

To employ the auto-collimator to accurately measure the angular inclination to horizontal of a surface which is considerably inclined, a calibrated wedge block may be employed with the level device, as shown in Figure 11. In Figure 11, 35 designates the surface to be tested for angular inclination. An accurately calibrated wedge block 36 is positioned on surface 35, the angle of the wedge block being selected so that when placed in this position the top surface 37 thereof will be nearly horizontal. Container 11 is positioned on surface 37. The auto-collimator reading may then be made, as described in connection with Figure 10.

As an alternative to the use of calibrated wedge blocks for measuring substantial angles to the horizontal where an auto-collimator is employed, the top and bottom plane surfaces of the level device may be disposed at an accurately known angle, corresponding to the approximate angle of the surface to be tested. An example of such an embodiment of the present invention is illustrated in Figure 12, wherein the plane mirror top surface 38 of the level container is at an accurately known angle to the plane bottom surface 39 thereof, said angle being approximately equal to the angle of inclination to horizontal of the surface 40 which is to be tested.

In the various embodiments of the present invention described above the inside diameter of the container cavity is chosen such that the portion of the surface of the fluent material 15 which is under the aperture 14 is optically plane and is beyond the meniscus of the liquid where it contacts the walls of the cavity. The critical value of said inside diameter varies from one liquid to another and depends upon the surface tension of the liquid.

In order to dampen out the higher vibrational frequencies normally encountered, a viscous liquid may be employed as the fluent material in the level container. Such a liquid should have a viscosity from approximately 100 to approximately 10,000 centipoises. If a liquid having a viscosity of less than 10 centipoises is employed, difficulty will be encountered in finding a sufficiently vibration-free locality for satisfactory operation of the instrument. Glycerin is an example of a satisfactory liquid.

While certain specific embodiments of optical level measuring means have been disclosed in the foregoing description, it will be understood that various modifications within the spirit of the invention may occur to those skilled in the art. Therefore it is intended that no limitations be placed on the invention other than as defined by the scope of the appended claim.

What is claimed is:

An optical level device for use with an auto-collimator comprising an opaque hollow member having a plane bottom surface and a plane mirror on its top surface, said plane mirror being parallel to said bottom surface, said top surface being apertured, and a quantity of fluent material in said hollow member, the surface of said fluent material having substantial reflectivity.

GERALD H. LOVINS.

REFERENCES CITED

The following references are of record in the file of this patent:

UNITED STATES PATENTS

| Number | Name | Date |
|---|---|---|
| 461,370 | Seidensticker | Oct. 13, 1891 |
| 921,773 | Wild | May 18, 1909 |
| 1,012,589 | Blumberger | Dec. 26, 1911 |
| 1,561,730 | Kodama | Nov. 17, 1925 |
| 1,912,358 | Bush | June 6, 1933 |
| 2,010,301 | Helfer | Aug. 6, 1935 |
| 2,350,151 | Dahl | May 30, 1944 |
| 2,357,023 | Reid et al. | Aug. 29, 1944 |
| 2,378,930 | Kendall et al. | June 26, 1945 |
| 2,410,667 | Luboshez | Nov. 5, 1946 |
| 2,413,399 | Wood | Dec. 31, 1946 |

FOREIGN PATENTS

| Number | Country | Date |
|---|---|---|
| 21,251 | Great Britain | Oct. 20, 1914 |